(12) United States Patent
Maddox et al.

(10) Patent No.: US 11,716,170 B2
(45) Date of Patent: Aug. 1, 2023

(54) MESSAGING VIA LOW ENERGY WIRELESS TRANSMISSIONS

(71) Applicant: RLT IP LTD., Gosport (GB)

(72) Inventors: Paula A. Maddox, Bristol (GB);
Richard E. Collins, Newport (GB);
Ferenc Visztra, East Cowes (GB);
Peter Robins, Woolton Hill (GB)

(73) Assignee: RLT IP LTD., Gosport (GB)

( * ) Notice: Subject to any disclaimer, the term of this patent is extended or adjusted under 35 U.S.C. 154(b) by 10 days.

(21) Appl. No.: 17/623,202

(22) PCT Filed: Jun. 26, 2020

(86) PCT No.: PCT/EP2020/068154
§ 371 (c)(1),
(2) Date: Dec. 27, 2021

(87) PCT Pub. No.: WO2020/260663
PCT Pub. Date: Dec. 30, 2020

(65) Prior Publication Data
US 2022/0166563 A1    May 26, 2022

(30) Foreign Application Priority Data
Jun. 28, 2019   (GB) ..................................... 1909359

(51) Int. Cl.
*H04L 1/00* (2006.01)
*H04L 1/1867* (2023.01)
*H04L 5/00* (2006.01)

(52) U.S. Cl.
CPC .......... *H04L 1/0061* (2013.01); *H04L 1/0041* (2013.01); *H04L 1/0045* (2013.01); *H04L 1/1896* (2013.01); *H04L 5/0055* (2013.01)

(58) Field of Classification Search
CPC ... H04L 1/0041; H04L 1/0045; H04L 1/0061; H04L 1/16; H04L 1/1896; H04L 1/1867; H04L 1/1845; H04L 5/0055; H03M 13/09; H03M 13/096; H04W 4/80
See application file for complete search history.

(56) References Cited

U.S. PATENT DOCUMENTS

| | | | |
|---|---|---|---|
| 2015/0278008 A1* | 10/2015 | Ren ....................... | H04L 1/0045 714/776 |
| 2016/0066212 A1 | 3/2016 | Visweswara | |
| 2016/0205496 A1* | 7/2016 | Su .......................... | H04W 4/80 455/41.1 |
| 2017/0048655 A1* | 2/2017 | Kwon ..................... | H04W 4/80 |

FOREIGN PATENT DOCUMENTS

WO    199504421 A1    2/1995

* cited by examiner

*Primary Examiner* — Shelly A Chase
(74) *Attorney, Agent, or Firm* — David Millers

(57) ABSTRACT

A protocol layer on top of the Bluetooth low energy (BLE) system of paired devices to provide transmission that allows arbitrary sizes of data to be sent. To guarantee transmissions, the transmissions may be validated and, if required, resent to replace data that was lost or corrupted. The protocol layer also supports Remote Procedure Calls to allow functions on either of two connected devices to be executed on one device on behalf of the other. A further protocol layer also allows high priority, short messages to temporarily interrupt the transmission of low priority, long messages.

21 Claims, 3 Drawing Sheets

MESSAGING VIA LOW ENERGY WIRELESS TRANSMISSIONS

BACKGROUND

Bluetooth Low Energy (BLE) is a wireless personal area network technology typically used to transmit small control and data messages between paired devices. One of the paired devices, e.g., a phone, sometimes referred to as the client, typically contains a user interface enabling user control of the pairing, while the other paired device, e.g., a heart rate sensor, may have specialized functionality but little or no means of user control other than communication via BLE. Applications using the low energy form of Bluetooth may be more easily developed than applications using standard Bluetooth because BLE does not require data transmission types to be registered with international regulatory bodies or other corporate entities. Further, BLE interfaces consume considerably less electrical power than do standard Bluetooth interfaces and are therefore particularly useful in low energy applications such as in the smartphone, health, sport, and fitness sectors.

The BLE protocol, by default, provides guaranteed delivery of a Maximum Transfer Unit (MTU) of just 20 bytes. This means transfer units larger than 20 bytes may be lost or corrupted unless data beyond the 20-byte limit are removed. Also, the data in BLE transfer units is binary only. No formatting or processing is carried out on the data from the point of view of BLE.

BRIEF DESCRIPTION OF DRAWINGS

The drawings illustrate examples for the purpose of explanation and are not of the invention itself. Use of the same reference symbols in different figures indicates similar or identical items.

DETAILED DESCRIPTION OF THE INVENTION

Bluetooth low energy (BLE) provides protocols for guaranteed wireless transmission of data but these protocols can be slow and require use of relatively small transfer units. Accordingly, BLE's guaranteed transmissions are not usually used to transmit large volumes of data. However, in accordance with one aspect disclosed herein, a lightweight transmission protocol can be overlaid or built upon the non-guaranteed data transmission infrastructure of BLE and can guarantee receipt of moderate volumes data at considerably higher rates than available through standard BLE processes. In one specific example of the present disclosure, an "arbitrary-data-size" communication layer on top of an industry-standard communication protocol, e.g., BLE, provides half duplex transmissions that allows data transmissions of arbitrary sizes. Guaranteed delivery can be provided for the arbitrary-data-sized layer using data transmission validation and, if required, retransmission of all or portions of the data to replace data that was lost or corrupted. A further "prioritized" communication layer may employ message priorities to allow high priority messages, typically shorter messages, to temporarily interrupt the transmission of low priority, typically longer messages. The overlaid protocols may all be implemented using libraries that operate on multiple layers. For example, the prioritized layer uses the guaranteed layer, which in turn uses the arbitrary data size layer. One or more of the layers layers may support Remote Procedure Calls (RPCs) to allow procedures or functions on either of two paired devices to be executed on one device on behalf of the other device.

Figure 1:
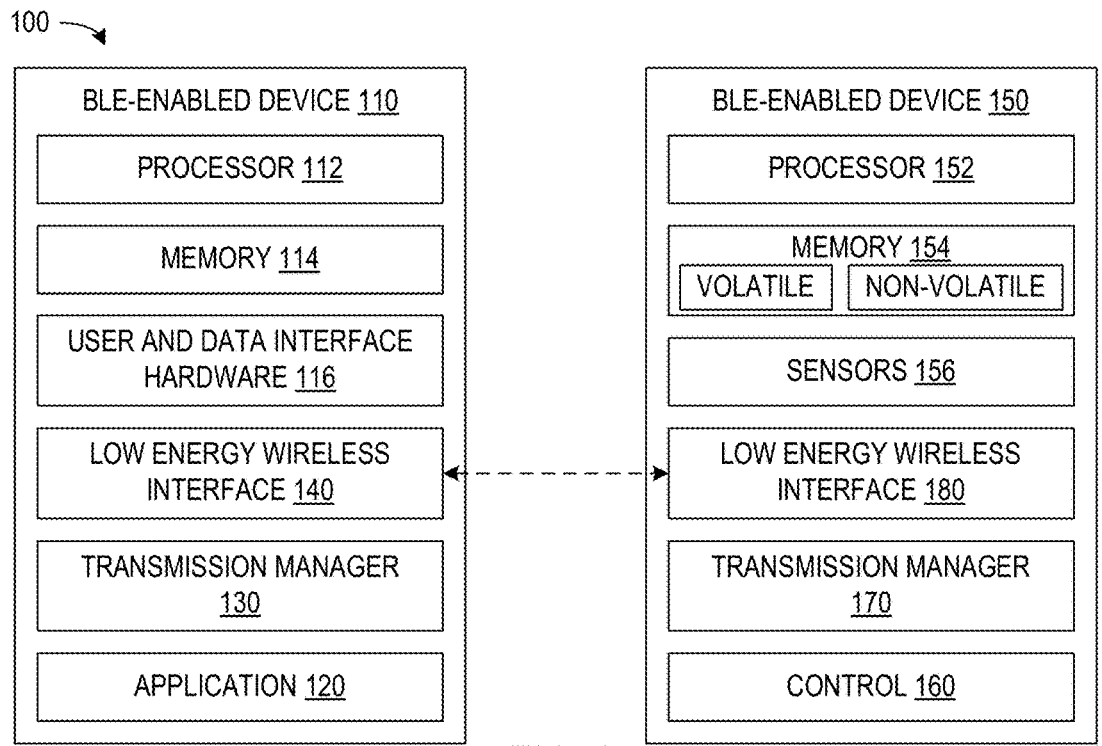
FIG. 1 is a block diagram of a system employing paired devices and transmission managers in accordance with one example of the present disclosure.

In accordance with an aspect of the current disclosure, a BLE-enabled device may use a transmission manager to ensure delivery of any size of data unit to another BLE-enabled device. FIG. 1 shows an example of a system 100 including a BLE-enabled device 110 and a BLE-enabled device 150 that may need to communicate data or procedure calls in one or both directions between devices 110 and 150. In general, devices 110 and 120 may differ in functionality and one device 110 or 150 typically has greater available processing power, electrical power, or other capabilities.

PCT App. No. PCT/EP2019/067485, entitled "Motion Capture System" describes a related system in which a user device, e.g., a smartphone, may communicate wirelessly with a measurement system, e.g., a motion sensing system. The user device more generally may be a computing system including one or more specialized or general purpose computers configured or programmed to process motion data, and the user device has greater user-interface capabilities, e.g., a touch screen and speaker. The measurement system, e.g., a pod with connected motion sensors, may be attached to or carried in a user's garment and may be capable of measuring motion but may have limited electrical and processing power and minimal direct user interface hardware or abilities. Accordingly, the measurement system may be a portable or battery-operated system that would benefit from using low power wireless transmissions of moderate quantities of data, e.g., measurement data.

In one example, device 110 provides a user interface, and device 150 provides sensing capabilities, and devices 110 and 150 need to communicate user commands, configuration data, or procedure calls from device 110 to device 150 and sensor data from device 150 to device 110. Device 110 as shown in FIG. 1 may be a computing device such as a smartphone or a tablet, laptop, or desktop computer including hardware such as a processor 112, memory 114, and user and input/output (I/O) interface hardware 116. Device 110 may employ hardware 112, 114, and 116 to implement or execute a user interface and an application 120 responsive to user input. Application 120 may implement or employ the user interface to receive and execute or relay user commands and provide user-friendly output, e.g., video and audio, that may be responsive to the user commands.

Application 120 is on one side of a transmission manager 130, and an industry-standard low energy wireless interface 140 is on the other side of transmission manager 130 to implement wireless communication with device 150. In one example of the present disclosure, wireless interface 140 is an industry-standard Bluetooth Low Energy interface capable of transmitting or receiving Bluetooth transfer units to and from device 150. Interface 140 may particularly include a radio transceiver and standard BLE driver software for operation of the radio transceiver.

Device 150 may employ hardware such as a processor 152, memory or data storage 154, and sensors 116 to obtain measurements, e.g., motion data, and to execute control module 160, e.g., system controlling software or firmware. Control module 160 may, for example, control sensors 116 to obtain data that may be stored in volatile or non-volatile memory 154 and transmitted to device 110 automatically or upon request.

A transmission manager 170 in device 150 is logically between control module 160 and an industry-standard low energy wireless interface 180 implemented in device 150. In particular, for device 150 to transmit data to device 110, transmission manager 170 may intercept or receive data from control module 160, construct one or more messages containing the data, and use wireless interface 180 to transmit transfer units to wireless interface 140 in device 110. Wireless interface 180, like interface 140 of device 110, may be a BLE interface capable of transmitting and receiving Bluetooth transfer units. Transmission manager 130 in device 110 receives transfer units through wireless interface 140 and processes the transfer units to extract the message data. Transmission managers 130 and 170 can monitor which messages were received, determine whether received messages contain errors, and handle resubmission or retransmission of portions of messages that did not transmit correctly. Accordingly, applications 120 and 160 do not need to handle resubmissions. Transmission manager 130 or 170 may inform application 120 or control module 160 when data has been successfully transmitted between devices 110 and 150 or if any errors occurred during a transmission. In some implementations, transmission manager 130 or 170 only reports errors when the transmission manager has no options left to ensure delivery.

Transmission managers 130 and 170 operate cooperatively in devices 110 and 150. Transmission managers 130 and 170 in one example of the present disclosure are configured to communicate through standard Bluetooth low energy interfaces 140 and 180 transmitting BLE transfer units. A size selected for the BLE transfer units energy may be too large for the guaranteed delivery mechanism because using the BLE guaranteed delivery mechanism for small transfer units is slow. Data flow using larger BLE transfer units may be much faster for moderate amounts of data, but the BLE standard transmissions may corrupt the data or not send the data at all. As disclosed herein, a custom (not an industry standard) overlay protocol may use the same BLE hardware and protocols but guarantee delivery of any size data at a much faster rate than possible using BLE guaranteed transmissions. Alternatively, transmission managers 130 and 180 can apply a similar overlay protocol for transmission of data via any potentially lossy, industry-standard communication protocol such as the User Datagram Protocol (UDP), a frequently used Internet Protocol (IP) for Ethernet and Wi-Fi communication.

An example of a data transmission from device 150 to device 110 may occur when control module 160 has a block of measurement data that application 120 has requested or that control module 160 has otherwise identified for transmission. The block of data may be too large for a transfer unit having guaranteed delivery using BLE. Control module 160 passes the data to transmission manager 170, and transmission manager 170 uses the data to construct one or more messages and then queues the message or messages for transmission through wireless interface 180. For use with BLE, each message may be transmitted as one or multiple BLE transfer units.

Figure 2:
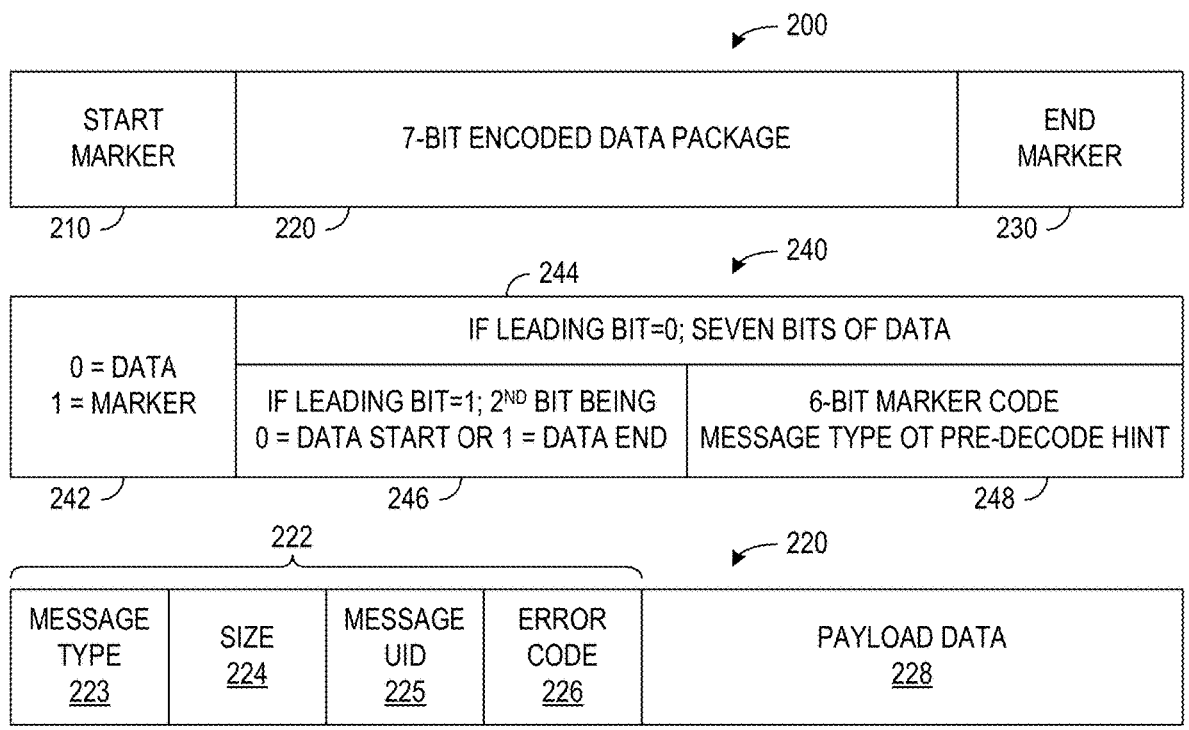
FIG. 2 is a block diagram illustrating a message format that can be overlaid on Bluetooth Low Energy (BLE) or other lossy wireless transmission protocols in some examples of the present disclosure.

FIG. 2 illustrates a format for a message 200 in accordance with one example of the present disclosure. Message 200 includes a start marker 210, a data package 220, and an end marker 230. In one specific example, start marker 210 and end marker 230 are a single byte each, data package can contain any number of bytes, and all of the bytes are 7-bit encoded as described further below. Alternative examples may use data units of a size other than a byte.

FIG. 2 also illustrates a format for a 7-bit code byte 240. Code byte 240 has flag 242 in a target position, e.g., a leading or most significant bit, that is either 0 to indicate code byte 240 is data or 1 to indicate code byte 240 is a marker. If flag 242 identifies data (e.g., is 0), the remaining seven bits 244 of byte 240 are data. If flag 242 identifies a marker (e.g., is 1), another flag 246, e.g., the next bit, is either 0 to indicate a start marker, e.g., start marker 210, or is 1 to indicate an end marker, e.g., end marker 230. The remaining bits 248 of a marker, e.g., 6 bits of a byte-size marker, may contain a marker code, which may be a message type pre-decode hint. Marker code 248 in a start marker byte 210 may particularly indicate a message payload type for the associated data package 220. For example, data package 220 of the message begun by the start marker may include: Java Script Object Notation (JSON) which the receiver can parse; raw binary data that may include its own metadata further indicating type; or a chunk of a larger message such as in a prioritized messages described further below.

In accordance with a further aspect of the present disclosure, data package 220 may be formatted to include metadata 222, specifically in a header, and payload data 228 following the header. (As indicated above, all bytes in data package 220, whether part of metadata 222 or payload 228, may be 7-bit encoded, e.g., have a leading zero to distinguish data package 220 from marker bytes 210 and 230.) In the illustrated example of FIG. 2, metadata 222 includes an 8-bit message type field 223. The value in the message type field 223 may be used with marker code 248 in start marker 210 to further distinguish the message types. For example, message type field 223 may include a flag indicating whether or not message payload data 228 was compressed and a compression type field indicating which compression technique was chosen. Message type field 223 may further indicate whether the message is a "chunk" of a larger message as described further below or indicate the type of content in payload data 228. Messages 200 may, for example, contain payload data 228 that is structured as JSON (Javascript Object Notation), ASCII (American Standard Code for Information Interchange) with a pre-specified top-level name identifier (as an example: "DROID"), or application-specific data. Message type field 223 may indicate a type or structure for payload data 228, but message type field 223 may be omitted as redundant in some implementations when start marker by 210 contains a sufficient message type hint. Metadata 222 further includes a 32-bit size field 224 indicating a size of the actual message data in payload 228 (since payload data 228 may be padded with zeros) and a 32-bit UID (Unique IDentifier) field 225 used to identify and distinguish messages.

Header 222 further includes an error code field 226, which may contain an error detection code or an error correction code. For example, message payload data 228 may be padded with zero bytes up to a total number of bytes divisible by 4, and the sender, e.g., transmission manager 170 in device 150, may calculate a 32-bit CRC32 (Cyclic Redundancy Check) from payload data 228 and store the CRC value in error code field 228 of header 222. After transmission of the entire message 200, the receiver e.g., transmission manager 130 by device 110, may again calculate a 32-bit CRC from the received payload data and compare the calculated value to the received value of error code field 226 to ensure integrity of payload data 228 as received.

The transmitter, e.g., transmission manager 170 in device 150, may insert start and end markers 210 and 230 as the only bytes in message 200 that have the most significant bit set to 1 (i.e., have a decimal values greater than 127). Start marker byte 210 has the second most significant bit set to zero, while end marker byte 230 has that bit set to 1. Thus, the receiver, e.g., transmission manager 130 in device 110, can identify the start and end of a message 200, and if the receiver falls out of synchronization with the sender, only one message is lost, and the receiver can identify the start of the next message from the presence of another start marker, thus re-synchronizing the sender and receiver.

Hint field 248 in the start message marker byte 210 give the receiver an early hint as to the type of data being sent in message 200 before the entire data package 220 has been delivered and decoded. For example, hint 248 may indicate whether payload data 228 is compressed or may indicate a type or use of payload data 228. Hint 248 may allow the receiver, e.g., transmission manager 130, to more timely provide information to a user, or to application 120, improving an overall user experience. Examples of pre-decode hints are given in Table 1 for an example in which the transmitter, e.g., device 150, is a measurement device, that may send "metrics" that are quantities normally evaluated or displayed as numeric quantities or "avatar" data that are quantities that application 120 employs in generating an avatar representing the measured motion.

TABLE 1

Hint Field Values

| 6-Bit Value | Hint Interpretation |
|---|---|
| 0 × 00 | No hint (message is short); |
| 0 × 01 | Metrics |
| 0 × 02 | hifi swing avatar |

In an example of the present disclosure described further below, message 200 is transmitted over a Bluetooth low energy communication framework using non-guaranteed notifications. The overlay protocol, e.g., implemented through transmission managers 130 and 170, can provide guaranteed or not-guaranteed messages that may be passed in sequence through the same Bluetooth data stream using the message format described above. To guarantee delivery, if part of the data is lost or corrupted, acknowledgements may be sent in the opposite direction, i.e., from a receiving device to a connected transmitting device. In one specific example, messages are divided into three classes: Transient, which are not guaranteed to be sent; Volatile, which are guaranteed while the transmitting device is powered, but if the transmitting device powers down before the message is sent, the message will be lost; and Persistent, which are guaranteed across power cycles of the transmitting device, in which case, the message data is written to persistent storage and re-queued for sending upon power up of the transmitting device.

The transmission manager of the transmitting device may assign a unique identifier to each guaranteed message and store the assigned identifier in UID field 225 of the message before transmission. An identifier value of zero may be reserved and used in the UID field 225 of non-guaranteed messages. In one example, the transmission manager in the transmitting device uses a counter to assign identifiers to messages and increments the counter to generate the new UID each time a message is constructed, and the transmission manager of a device may re-start the counter each time a device powers up if there are no persistent message from before the device powered down.

Non-guaranteed messages may be (and preferably are) small, but many of non-guaranteed messages (e.g., frames of data for a live avatar animation) may be transmitted. To help prioritize guaranteed messages, when guaranteed and non-guaranteed messages are available to be sent, the non-guaranteed message may not be added to the underlying message data stream if more than four guaranteed messages are awaiting protocol transactions.

One device (the receiving device) may act as "master" in a guaranteed-delivery protocol transaction in accordance with an example of the present disclosure. The master controls the flow of messages, with the other device acting as "slave," reacting to requests or notifications received from the master. For interacting with the underlying BLE communication infrastructure, the master is the "client" and the slave is the "server." The slave, in general, constructs messages, such as message 200 of FIG. 2, stores the constructed messages, and maintains a queue containing entries corresponding to the messages that the slave is ready to send. In particular, the slave may store volatile guaranteed or non-guaranteed messages in volatile memory and store persistent guaranteed messages in non-volatile storage. When the slave is first powered up, the message queue is empty, and the slave checks non-volatile storage for any messages that were not successfully sent during a previous uptime. Any messages still stored in non-volatile storage when the slave powers up are persistent messages that have not been successfully sent, and the slave queues the persistent messages to be sent using the guaranteed delivery protocol before any other messages can be added to the message queue. Whether or not messages are in the message queue, the slave waits for the master to request transmission in accordance with the overlaid protocol.

Figure 3:
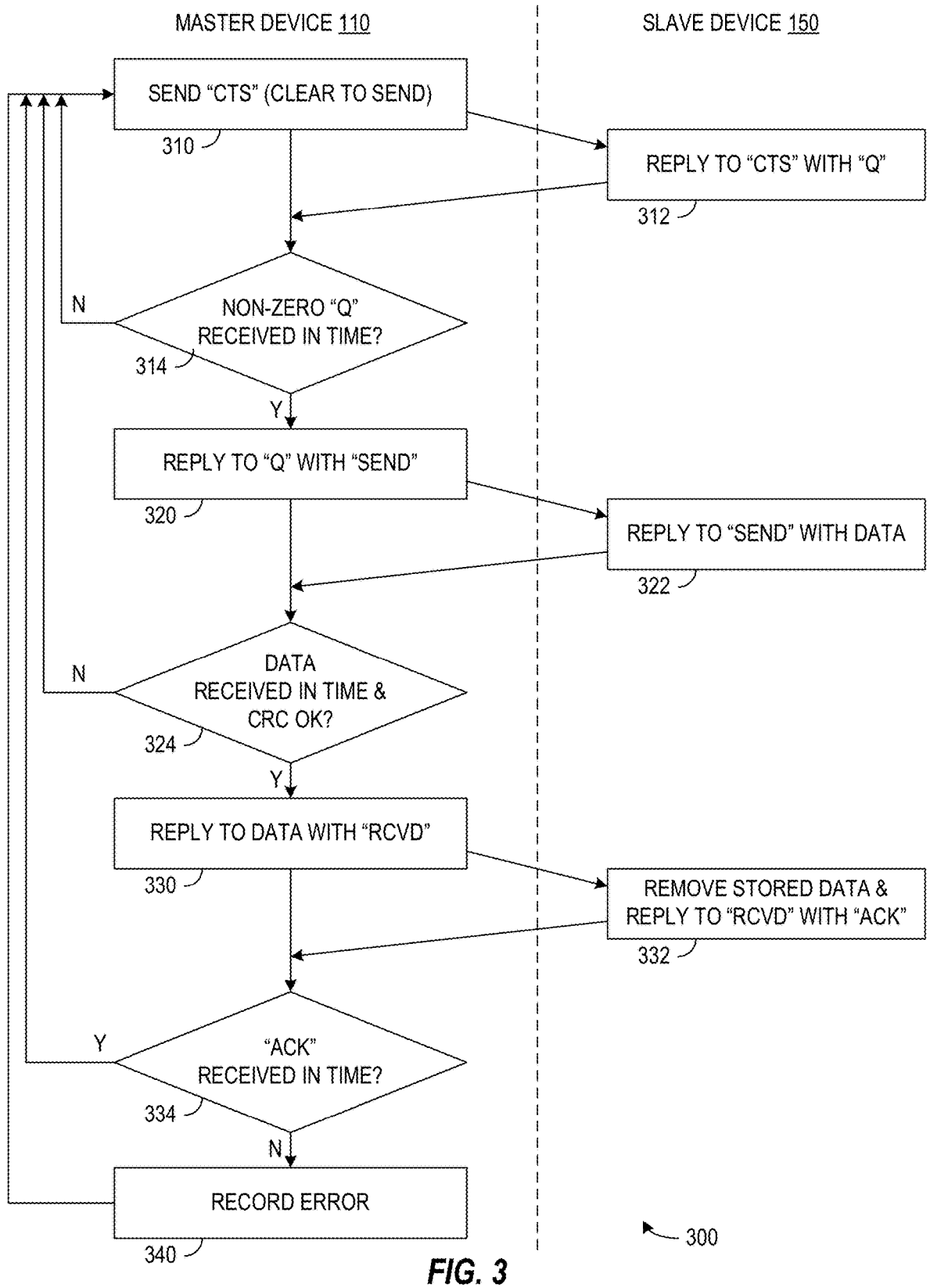
FIG. 3 is a flow diagram illustrating a transmission protocol on both sides of a communication channel to guarantee delivery of data when the underlying channel may lose data in some examples of the present disclosure.

FIG. 3 is a flow diagram of a process 300 for a guaranteed delivery transmission protocol in accordance with one example of the present disclosure, which will be described with reference to the structure illustrated in FIG. 1. FIG. 3 particularly shows processes executed on both sides of a communication channel for guarantee delivery data transmission when the underlying channel may lose data in some examples of the present disclosure. In a process block 310, the master device, e.g., device 110 executing transmission manager 130, waits a delay time, e.g., 500 milliseconds, and then sends a "CTS" ("clear to send") notification to the slave device, e.g., device 150 executing transmission manager 170. For example, after the delay time, transition manager 130 may direct BLE 140 to send a guaranteed transfer unit corresponding to a clear-to-send notification. The content of a example clear-to-send notification may include {"DROID":"CTS"} where "DROID" is a code for guaranteed delivery portion of the transmission manager 170 of the slave device 150 and "CTS" is a code meaning the master has cleared the slave to transmit a message. In general, the CTS message may be short enough for guaranteed delivery in a transfer unit of the industry standard, e.g., BLE.

The master waits for a wait time, e.g., 15 seconds, in case the slave is unable to reply promptly. A decision block 314 occurs during the wait time, and if the master does not receive a response to the CTS message during the wait time, the master branches back to process block 310 and repeats the delay and the sending of a "CTS" message.

The slave device, upon receipt of a "CTS" message in process block 312, sends a "Q" response to the master. The "Q" response may contain a size of the slave's message queue and/or the UID of the next guaranteed delivery message in the queue. (The slave may select the next message based primarily on priorities assigned to the queued messages and secondarily on the time or order of the messages in queue.) As an example of a "Q" response, the slave may reply to the CTS notification using the following JSON data structure: {"DROID": {"Q":{"SZ":integer, "UID":integer}} where "DROID" identifies the guaranteed delivery protocol, "Q" identifies the response type, "SZ" is a key for an integer-valued queue size, and "UID" is a key for an integer-valued message identifier. A message queue size of zero indicates that no message in the slave device is available and queued for transmission.

If, before the wait time expires, the master receives a "Q" response from the slave, the master checks whether the response contains a zero queue size value. If the queue size value is zero, the slave does not have any messages to transmit, and the host returns to process block 310. If the master while executing process block 314 receives the "Q" response that contains a non-zero queue size value, the master will invalidate its asynchronous wait timer, temporarily disabling further sending of the "clear to send" message. The master proceeds to a process block 320 and will then send a "SEND" command to the slave with the same UID that the master received. For example, a send command may include: {"DROID":{"SEND":integer}} where "DROID" identifies the guaranteed delivery protocol, "SEND" is a code to initiate a message transmission, and integer is the UID of the message to be sent.

The slave, in a process block 322 that begins when the slave receives the "SEND" command from the master, sends the appropriate message with the indicated UID. For example, transmission manager 170 in slave device 150 may send an entire message or may send a message that contains a chunk of a larger message as described further below. In the example where wireless interface 180 is a BLE interface, BLE interface 180 may transmit a message (or a chunk of a message) as a single message transfer unit. The message transfer units are generally larger than the 20 byte, which is the maximum for guaranteed delivery using the BLE standard. The overlaid protocol provides for arbitrary payload sizes described above with reference to FIG. 2, but as described further below, full messages may be broken up into chunks corresponding to single BLE transfer units, but the receiver in arbitrary payload protocol will re-assemble the chunks into a message or data of arbitrary size. In one example of the present disclosure, chunk messages or the message transfer units may have a maximum size of around 150 bytes, which BLE can transmit with sufficient reliability between two particular hardware devices and which provides sufficient capacity for common data transfers, e.g., for a full set of motion data measurements in a motion analysis system.

The master in decision block 324 waits to receive the message that the slave was directed to send. Once the master has received the entire message including header and payload data as described above with reference to FIG. 2, the master calculates a CRC value for the payload data and checks the calculated CRC value with a received CRC value embedded in the header, e.g., field 226 in message format of FIG. 2. If the calculated and received CRC values match, the master proceeds to a process block 330 and sends a "RCVD" message to the slave. A "RCVD" message may have content such as {"DROID":{"RCVD":integer}} where "DROID" identifies the guaranteed delivery protocol, "RCVD" is a code for valid message received, and the integer is the UID of the message received. The master can then strip any zero padding bytes from the end of the message payload data and process payload data further, e.g., transmission manager 130 provides the data to application 120. If the calculated and received CRC values do not match or if the complete message was not received in time, the data is not processed, and the master does not proceed to process block 330 but returns to process block 310.

The slave in process block 322 receives the "RCVD" message and checks for the presence of the message data in memory, e.g., volatile and non-volatile storage, and the UID in the transmission queue. The slave removes entry corresponding to the UID from the transmission queue and deletes the message from the volatile storage (RAM) or, if the message was a persistent message, removes the message from the persistent storage. If the data was found and removed successfully, the slave then sends an acknowledgement or "ACK" message to the master to the master, e.g., sends {"DROID":{"ACK":integer}} where the integer is the message UID.

If the master in a decision block 334 does not receive an "ACK" message in time or receives an "ACK" message where the UID integer is zero, an error occurred (e.g., the message was no longer available to be removed). This can usually be ignored as the data has been asserted as delivered correctly, but the master in a process block 340 can record that a message error and may use message errors to determine whether the slave operation has operating problems. If the master in decision block 334, receives a timely "ACK" message that contains the UID of the previously received message, the master branches back to process block 310 and re-enables the "clear to send" loop to receive another message.

Figure 4:
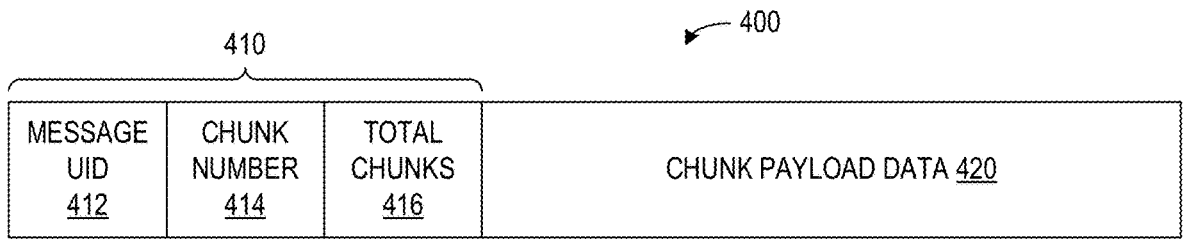
FIG. 4 is a block diagram illustrating formatting for a data package in an example of the present disclosure where multiple messages may carry chunks of data from a single larger message.

A further "prioritized" message protocol may be built or overlaid upon the guaranteed delivery protocol described above. The prioritized protocol allows high priority messages, typically small messages, to interrupt the delivery of low priority messages, typically large messages. At the slave device, large messages may be divided into chunks, which may be treated as separate messages. The chunk messages may employ further metadata within payload data 228 in the message format of FIG. 2. FIG. 4, for example, shows a payload data 400 including a metadata 410 and chunk payload data 420. Metadata 410 contain a message UID field 412 for the identifier of the full message, and a chunk number field 414 for a chunk number indicating reassembly order for chunk payload data 420 making up the full message. Metadata 410, at least in a first chunk (e.g., numbered 0) for a full message, may also contain the total number of chunks in the full message so the receiver (master) can determine when all of the chunks have been received and the full message can be fully re-assembled. A chunk message will also have the metadata 222 of FIG. 2, in which message type field 223 may specify the message type as being a chunk of a full message. Size, message UID, and error code 224, 225, and 226 for a chunk message may serve the same purposes as described above. Each chunk thus has its own separate UID, so the chunk can be sent as if the chunk were a complete message being transmitted using the guaranteed delivery protocol. In alternative examples, validation or error detection may be conducted using the payload data of each chunk or the payload data of the full message.

Figure 5:
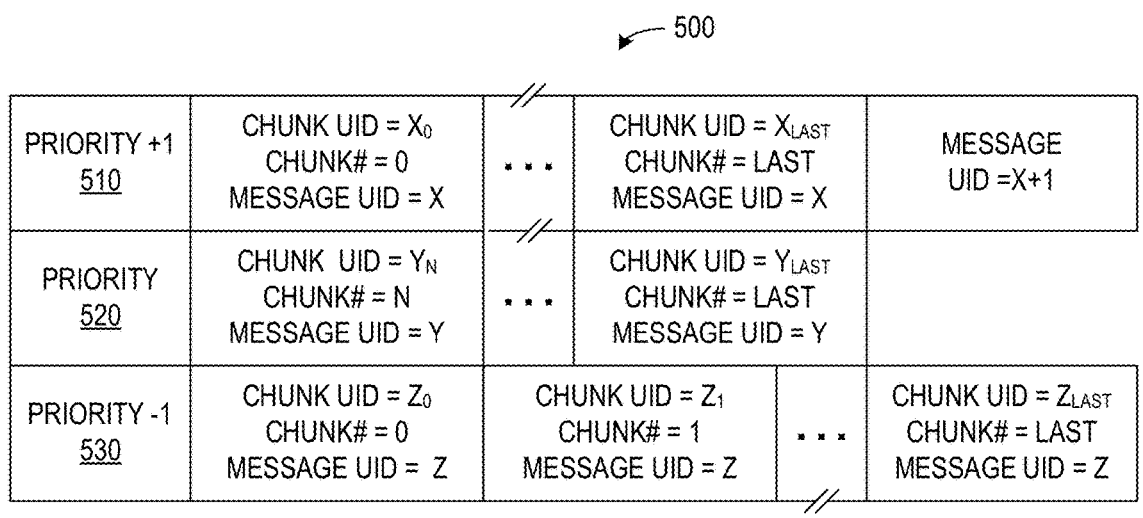
FIG. 5 is a block diagram illustrating a slave-side storage structure of prioritized messages to be sent to the master in some examples of the present disclosure.

FIG. 5 shows a slave-side storage structure 500 of prioritized message chunks to send to a master in some examples of the present disclosure. The sending device (slave) stores individual messages (e.g., full messages or chunk messages) in a lookup table of priority 510, 520, and 530 to order queues of messages. When filling storage structure 500, the slave selects an appropriate queue 510, 520, or 530 for a message by specifying the priority of the message. A message made up of multiple chunk messages is queued by appending the chunks in order, e.g., left to right in FIG. 5. When replying to a CTS message as described above with reference to FIG. 3, the slave selects an non-empty queue 510, 520, or 530 having the highest priority and returns to the master a "Q" message containing the UID of a full message or a chunk from the messages in the selected queue. Chunks are then popped from the highest priority non-empty queue for sending using the guaranteed delivery protocol. In the example of FIG. 5, new messages with identifiers X and X+1 were added to a higher priority queue 510 before a chunk number N from a lower priority queue 520 was transmitted to the master. The new message having UID=X (and new message having UID=X+1) from the highest priority queue 510 may be transmitted before transmissions of the next chunk message (chunk number N) from message UID=Y in a lower priority queue 520 are transmitted. More specifically, after transmitting a chunk having UID=$Y_{N-1}$, which is chunk number N−1 in a full message having UID Y, the slave transmits a message with UID $X_0$, which corresponds to the first chunk in a message with UID=X, instead of transmitting a chunk having UID=$Y_N$, which is the next chunk number N in the full message having UID Y. Thus, transmission of the message with UID=Y was interrupted but may be resumed after higher priority messages having UID X and X+1 are delivered. The message having UID=Z is in an even lower priority queue 530 and may wait until the higher priority messages in queues 510 and 520 have been transmitted.

Figure 6:
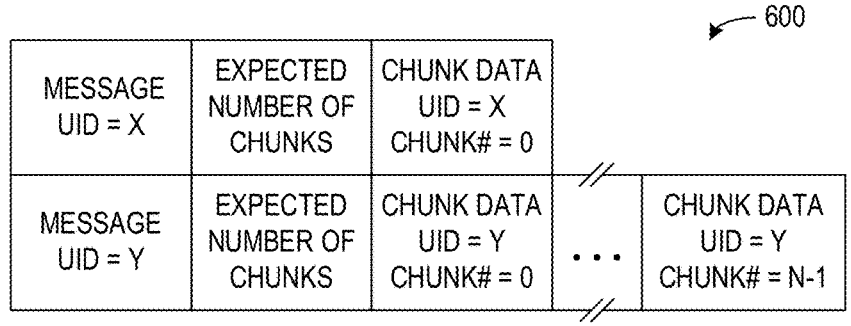
FIG. 6 is a block diagram illustrating a master-side storage structure for collating received message chunks before reassembly and handing over to the client application in some examples of the present disclosure.

FIG. 6 shows the master side storage structure 600 for collating received message chunks before reassembly and handing messages over to the client application in some examples of the present disclosure. The receiver (master) maintains a lookup table of full message UID to pairs of: expected number of chunks and a lookup table of chunk number to chunk data. Whenever a full complement of chunks is received, the master can re-assemble the full message from the chunk data, and can remove the chunk lookup table from the main lookup table. In the example of FIG. 6, the master received N chunks of the message having UID=Y, before the slave started transmitting chunks of the message having UID=X.

Chunk size and the maximum transfer unit size can be customized to balance the promptness of high priority message transmission versus total data throughput. In particular, sending of a particular chunk through the guaranteed send mechanism must complete before a chunk from a higher priority message can be sent. If the chunks are small, the higher priority message can start being sent sooner. However, small chunks require more transaction messages sent to and from the two devices between the sending of chunks of data, which may reduce the total average throughput of the desired data payloads. The slave always chooses to send the top left existing chunk from storage structure 500 of FIG. 5 first, removing the chunk data lookup after acknowledging that the master has received the chunk message, and the slave then slides other data in the top row to the left if there is any unsent chunks remaining from the message. The slave may add new messages or chunks to the right of the corresponding priority row.

The sending application, e.g., control module 160 in device 150, can determine the appropriate priority to assign to each message sent through the transition manager 170. Appropriate values may be specific to the application, and the types of messages the application needs to send. As a rule-of-thumb, higher priority messages may be shorter than lower priority messages for increased responsiveness at the receiver end. As an example, device 150 may use a low priority when transmitting large data blocks containing detailed measurements of a user action. Meanwhile, device 150) uses a high priority for short messages indicating hardware errors or notifications that recent user actions had been recognized. This allows a system to provide prompt feedback to a user. For example, in a motion sensing and analysis system, a user may be quickly informed that it is appropriate to continue their tasks, in the knowledge that measurements of new actions will be processed in due course and corresponding low priority data will be sent when bandwidth becomes available.

The receiver (master) does not need to know the priority of an incoming message as the order of message chunks sent is entirely under the control of the sender (slave). The receiver only needs to store the expected total number of chunks for a message and the chunks received so far so that the receiver can determine when the data for an entire message has been received. With all of the chunks received, the transmission manager can re-assemble the message and deliver the message to the rest of the receiving system. At that point, the full message LID, Expected Number Of Chunks and all the Chunk data are removed from storage structure 600 of FIG. 6, i.e., an entire row of structure 600 may be removed. The receiver may check for total message receipt completion each time a chunk is received and receipt is acknowledged by sender.

In accordance to a further aspect of the present disclosure, messages may have a type indicating a remote procedure call. To enable Remote Procedure Call (RPC) functionality, the master/client device (e.g., a phone) and slave/server device (e.g., a sensor system) may use a JSON formatted data package, e.g., data payload 228 of FIG. 2, to state the function or procedure to be called and the parameters for the function or procedure being called. The return value of the function and the success status of the call may be returned in a set format so that the caller can connect the correct code with the results. An example of the JSON string in the payload data of a message for calling an RPC on the phone may include {"function":"ScanNetworks","args":["true", "10"]}, where "function" is a key identifying a function "ScanNetworks" and "args" is a key for the arguments "true" and "10" that the function uses. A response message to a function call may contain
{"return":{"function":"ScanNetworks","return":
  ["SSID_01","SSID_02"]}} where "return" is a key indicating the message is returned from a function call and the values "SSID_01" and "SSID_02" being returned, "function" is a key for identifying the function "ScanNetworks."

Although particular implementations have been disclosed, these implementations are only examples and should not be taken as limitations. Various adaptations and combinations of features of the implementations disclosed are within the scope of the following claims.

The invention claimed is:

1. A transmission process comprising:
a first device queuing for transmission a first message including payload data and metadata, the metadata including a first message ID and an error code, the first message having a size larger than a maximum size for which an industry-standard protocol provides guaranteed delivery;
the first device employing a first communication interface to transmit a first transfer unit using the industry-standard protocol, the first transfer unit containing the first message;
the second device employing a second communication interface to receive the first transfer unit using the industry-standard protocol;
the second unit extracting the error code from the first transfer unit and using the extracted error code to determine whether received data contain an error;
in response to determining the received data do not contain an error, the second device transmitting to the first device a received notification that includes the first message ID from the first message; and
the first device leaving the first message queued for transmission until the first device receives the received notification.

2. The process of claim 1, wherein the first device transmits the first transfer unit in response to a send command from the second device and the second device repeats the send command after determining the first message as received contains an error.

3. The process of claim 2, further comprising:
the second device sending a clear-to-send notification to the first device;
the first device responding to the clear-to-send notification with a response containing the first message ID; and
the second device responds to the response by transmitting the send command, the send command including the first message ID.

4. The process of claim 1, further comprising:
the first device queuing for transmission one or more additional messages, each including payload data and metadata, the metadata for each additional message including a message ID for the additional message, each of the additional messages having a size larger than the maximum size for which the industry-standard protocol provides guaranteed delivery, each of the additional messages and the first message containing a different chunk of data of a second message having a second message ID; and
the first device employing the first communication interface to transmit one or more additional transfer units using the industry-standard protocol, the additional transfer unit respectively containing the additional messages, wherein:
using the extracted error code to determine whether the received data contain an error comprises determining whether the data of the second message as received from the first message and the additional messages contains an error.

5. The process of claim 4, further comprising:
the first device queuing for transmission a third message that is assigned a priority higher than a priority of the first message and the additional messages; and
the first device employing the first communication interface to transmit a third transfer unit using the industry-standard protocol, the third transfer unit containing the third message, wherein:
at least one of the first transfer unit and the additional transfer units is transmitted to the second device before the third transfer unit is transmitted to the second device; and
at least one of the additional transfer units is transmitted to the second device after the third transfer unit is transmitted to the second device.

6. The process of claim 1, wherein the payload data of the first message includes a remote procedure call to be executed by the second device.

7. The process of claim 1, further comprising:
storing the first message in non-volatile memory in the first device;
upon reset of the first device, checking the non-volatile memory for stored messages, and in response to fining the first message, the first device queuing the first message for transmission.

8. The process of claim 1, wherein the industry-standard protocol is Bluetooth Low Energy (BLE).

9. A data transmission process comprising:
a first device encoding a first message to include a start marker having a set number of bits, followed by a data package including a plurality of data units that each contain the set number of bits, followed by an end marker having the set number of bits, the encoding providing flag at a target position respectively in the start marker and the end marker with a first value and providing flags at the target position in all of the data units with a second value that differs from the first value;
transmitting the first message from the first device to a second device using an industry-standard protocol; and
the second device identifying a received data package as including received data units having the flags with the second value and being between received data units having the flags with the first value.

10. The process of claim 9, wherein the data package is not limited to having a specific size.

11. The process of claim 9, further comprising the first device maintaining a queue of entries corresponding messages, wherein maintaining the queue comprises the first device adding to the queue an entry corresponding to the first message.

12. The process of claim 11, further comprising:
the second device notifying the first device that the first device is cleared to send messages; and
the first device notifying the second device that a message is available and transmitting the first message in response to a send command from the second device.

13. The process of claim 11, wherein each of the entries in the queue indicates a priority of the message corresponding to the entry.

14. The process of claim 13, wherein the first device transmits messages in order according to the priority.

15. The process of claim 11, wherein the data package represents a header and payload data, the header including an error detection code for the payload data, wherein the first device removes the entry corresponding to the first message from the queue only in response to receiving a notification from the second device indicating that the second device received the first message.

16. The process of claim 15, further comprising:
the first device storing the first message in non-volatile memory; and
upon the first device starting up, the first device finding the first message in the non-volatile memory and in response adding an entry corresponding to the first message to the queue.

17. The process of claim 15, further comprising:
the second device determining a calculated error detection code from a payload data part or the received data package; and
the second device sending to the first device a notification that the first message was received only if the calculated error detection code is equal to an error detection code in a header of the received data package.

18. The process of claim 9, wherein the data package of the first message comprises a header and payload data.

19. The process of claim 18, wherein the header in the data package of first message comprises at least one of:
a message type field holding a value identifying a type for the first message;
a flag indicating whether the payload data is compressed;
an identifier that uniquely distinguishes the first message from other messages from the first device;
an identifier of a second message, wherein the payload data of the first message is a chunk of the second message; and
an error detection code for the payload data.

20. The process of claim 19, wherein the message type indicates the payload data is one of text or raw binary data.

21. The process of claim 9, wherein the industry-standard protocol is Bluetooth Low Energy.

* * * * *